United States Patent
Luo et al.

(10) Patent No.: US 12,124,419 B2
(45) Date of Patent: Oct. 22, 2024

(54) TRANSFORMING DATA OF STRICT SCHEMA STRUCTURE DATABASE

(71) Applicant: International Business Machines Corporation, Armonk, NY (US)

(72) Inventors: Cheng Luo, Beijing (CN); Wen Wen Guo, Beijing (CN); Chu Yun Tong, Beijing (CN); Xiao Ming Hu, Beijing (CN); Miao Liu, Beijing (CN); Yi Xin Song, BeiJing (CN)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 17/654,861

(22) Filed: Mar. 15, 2022

(65) Prior Publication Data
US 2023/0297551 A1 Sep. 21, 2023

(51) Int. Cl.
  G06F 16/21   (2019.01)
  G06F 16/215  (2019.01)
  G06F 16/25   (2019.01)

(52) U.S. Cl.
  CPC .......... G06F 16/213 (2019.01); G06F 16/215 (2019.01); G06F 16/258 (2019.01)

(58) Field of Classification Search
  CPC .... G06F 16/213; G06F 16/215; G06F 16/258; G06F 16/1794; G06F 16/212
  See application file for complete search history.

(56) References Cited

U.S. PATENT DOCUMENTS

| | | | |
|---|---|---|---|
| 8,924,415 B2 | 12/2014 | Thomas | |
| 9,594,779 B2* | 3/2017 | Fischer | G06F 16/84 |
| 10,452,628 B2* | 10/2019 | Schwan | G06F 16/215 |
| 11,138,220 B2 | 10/2021 | Shah et al. | |
| 2006/0085451 A1* | 4/2006 | Pal | G06F 16/86 |
| 2008/0320012 A1 | 12/2008 | Loving et al. | |
| 2009/0240726 A1* | 9/2009 | Carter | G06F 16/211 |
| 2010/0070535 A1 | 3/2010 | Irun-Briz et al. | |
| 2015/0213366 A1* | 7/2015 | Gould | G06N 5/025 |
| | | | 706/11 |
| 2017/0220606 A1* | 8/2017 | Wang | G06N 5/04 |
| 2020/0311095 A1* | 10/2020 | Gorshtein | G06F 16/2358 |
| 2020/0349130 A1* | 11/2020 | Bracholdt | G06F 16/254 |
| 2020/0349160 A1* | 11/2020 | Du | G06F 16/24539 |
| 2020/0364242 A1* | 11/2020 | Martin | H04L 63/0823 |

(Continued)

OTHER PUBLICATIONS

Halpin et al., "Database Schema Transformation and Optimization," https://www.researchgate.net/publication/225519175, OOER '95: Object-Oriented and Entity-Relationship Modeling, Jan. 2006, 15 pgs.

(Continued)

*Primary Examiner* — Hosain T Alam
*Assistant Examiner* — Cecile H Vo
(74) *Attorney, Agent, or Firm* — Jared C. Chaney (57) ABSTRACT

A system may port a data model into a strict schema system, translate the data model into a transformation rule definition, fit the transformation rule definition to a transform action, receive strict schema data, perform the transform action on the strict schema data based on the transformation rule definition to form rough data, and execute filtering and enriching operations on the rough data to form loose schema data.

14 Claims, 7 Drawing Sheets

(56) References Cited

U.S. PATENT DOCUMENTS

2021/0081837 A1\* 3/2021 Polleri ................... G06N 5/022
2021/0149851 A1\* 5/2021 Belezko .............. G06F 16/9024
2023/0393832 A1\* 12/2023 Touati ..................... H04L 67/10

OTHER PUBLICATIONS

Ji et al., "An Approach to Graphically Describe XML Schema," https://ieeexplore.ieee.org/document/8244148, 2017 Chinese Automation Congress (CAC), Oct. 20, 2017, 6 pgs.

Li et al., "A Data Transformation Method Based on Schema Mapping," https://www.semanticscholar.org/paper/A-Data-Transformation-Method-Based-on-Schema-Li-Liu/18c87e7b1a43375d150fcfcf97d8c275882781b4, pp. 67-79, 2004.

Malki et al., "Semantic Enrichment of XML Schema to Transform Association Relationships in ODL Schema," Journal of Software Engineering and Applications, 2014, https://www.researchgate.net/publication/272440119, 11 pgs.

Mell, et al., "The NIST Definition of Cloud Computing," Recommendations of the National Institute of Standards and Technology, U.S. Department of Commerce, Special Publication 800-145, Sep. 2011, 7 pgs.

\* cited by examiner

FIG. 7 ize the structure and relationship of the tables in a
database. A schema may also facilitate tracking of what
information is and is not in the database. A schema may
inherently enforce data integrity constraints, which are a set
of rules that maintain consistent formatting of all entries.

TRANSFORMING DATA OF STRICT SCHEMA STRUCTURE DATABASE

BACKGROUND

Aspects of the present disclosure relate to transforming data of a strict scheme structure database.

A schema is a design of how a database is constructed. A schema describes the shape of the data and how it might relate to other tables in the database. Schemas contain information on objects in a database such as tables, attributes, data types and relationships. Schemas can also include triggers, views, indexes, and so on. Some common databases that use strict schemas are Oracle, MS SQL Server, and PostgreSQL. A schema can give a high level view of the structure and relationship of the tables in a database. A schema may also facilitate tracking of what information is and is not in the database. A schema may inherently enforce data integrity constraints, which are a set of rules that maintain consistent formatting of all entries.

BRIEF SUMMARY

The present disclosure provides a method, computer program product, and system of transforming data of a strict scheme structure database. In some embodiments, the method includes porting a data model into a strict schema system, translate the data model into a transformation rule definition, fitting the transformation rule definition to a transform action, receiving strict schema data, perform the transform action on the strict schema data based on the transformation rule definition to form rough data, and executing filtering and enriching operations on the rough data to form loose schema data. In some embodiments, matching can include selecting a rule definition and a corresponding action, such as a X rule definition and a X action or a Y rule definition and a Y action.

Some embodiments of the present disclosure can also be illustrated by a computer program product comprising a computer readable storage medium having program instructions embodied therewith, the program instructions executable by a processor to cause the processors to perform a method, the method comprising porting a data model into a strict schema system, translate the data model into a transformation rule definition, fitting the transformation rule definition to a transform action, receiving strict schema data, perform the transform action on the strict schema data based on the transformation rule definition to form rough data, and executing filtering and enriching operations on the rough data to form loose schema data.

Some embodiments of the present disclosure can also be illustrated by a system comprising a processor and a memory in communication with the processor, the memory containing program instructions that, when executed by the processor, are configured to cause the processor to perform a method, the method comprising porting a data model into a strict schema system, translate the data model into a transformation rule definition, fitting the transformation rule definition to a transform action, receiving strict schema data, perform the transform action on the strict schema data based on the transformation rule definition to form rough data, and executing filtering and enriching operations on the rough data to form loose schema data.

DETAILED DESCRIPTION

Aspects of the present disclosure relate to transforming data of a strict scheme structure database. While the present disclosure is not necessarily limited to such applications, various aspects of the disclosure may be appreciated through a discussion of various examples using this context.

In some embodiments, a solution is provided for the problem of high coupling dependency on data model during transforming data of strict schema structure, and improve development efficiency, enhance code aggregation, and support more enrichment operations. As used herein, a data model refers to a data structure as stored within a database, where the data model relates to a predetermined concept (e.g., where the data model captures sales of an organization, or performance of an component, or the like) with subsets of data (e.g., sales data of departments of the organization, or metrics on elements of the component) that are relatively static in structure.

A strict schema is a type of schema that follows a rigid format, with a predefined set of fields and their respective data types. For example, systems like logs, analytics, application performance systems (APMs), etc. have strict schema formats. With such schemas, the index documents have a known data structure, which makes it easier to load the data in an elastic search and get accurate results for queries. In some instances, schema data flows through pipelines. Each pipeline can be tailored to process data for a variety of factors. On the input side, pipelines can be formed for different types of data, computing resources, processing speeds, time periods of receiving data, etc. Likewise, different pipelines can be configured to process the same data in different ways. For example, each pipeline can be configured with different rules or different factors (e.g., predicting accuracy of results, analyzing data sets based on different factors, or different user preferences). In some instances, the strict schema defines the type of data processing used to process strict schema data. For example, the strict schema could be used to organize a data model into types such as conversational data, search results data, relational databases, records, etc. In some instances, strict schema is used to transfer data from a legacy application into a new application. For example, moving data from an older email system into a new email system. Generally, in some instances, strict schema processing is a method of processing data with a strict ruleset. Current strict schema systems lack a technical ability to change a data format or change a ruleset.

Figure 1:
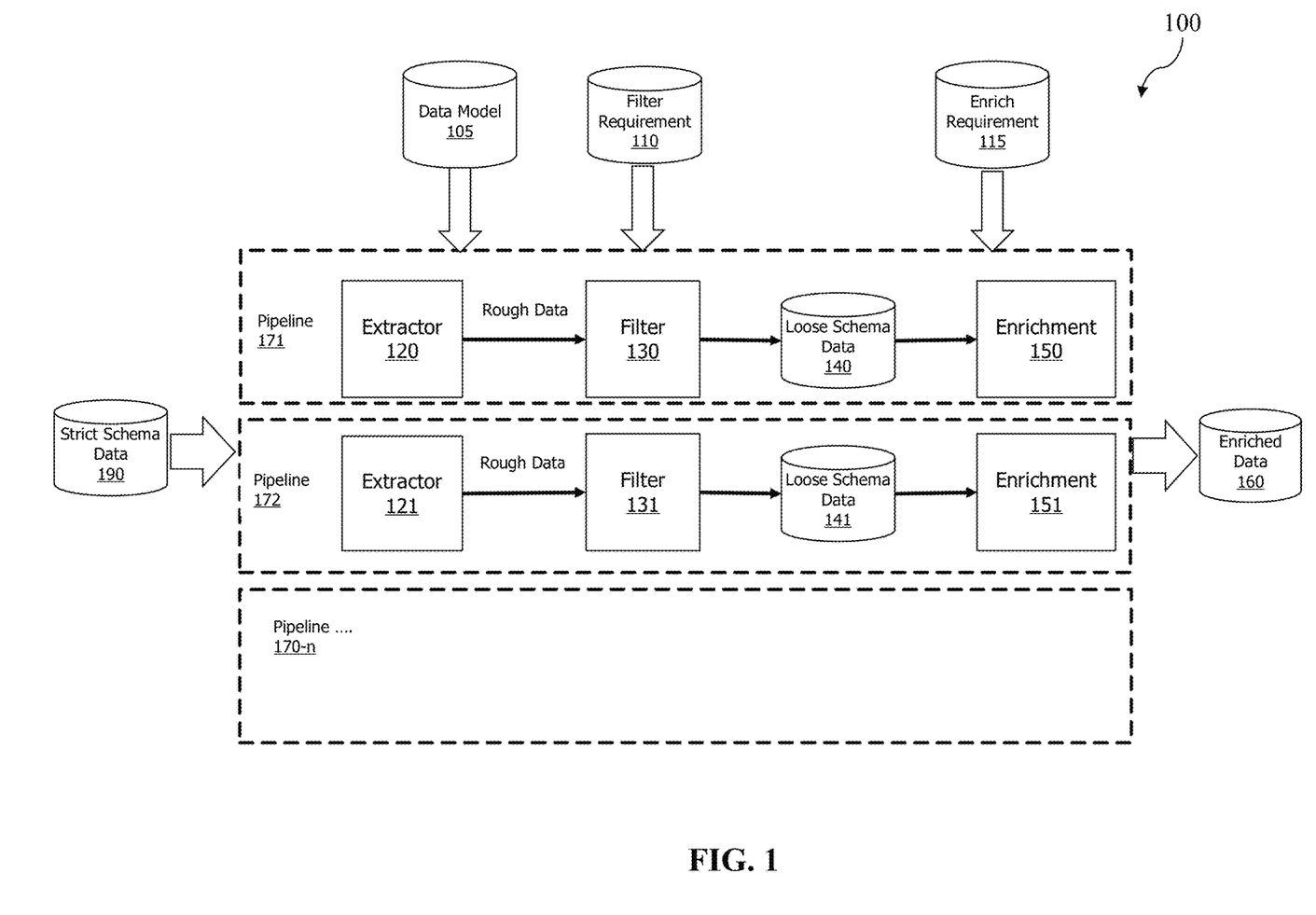
FIG. 1 illustrates an example workflow for a system using a strict schema, according to various embodiments of the present invention.

FIG. 1 depicts an example workflow 100 for a system using a strict schema. In some embodiments, a strict schema processes multiple pipelines 171, 172 . . . 170-*n* with a similar process. In some embodiments, the system receives strict schema data 190 (e.g., data that is to be processed with a strict schema), a data model 105, a filter requirement 110, and an enrichment requirement 115. In some embodiments, extractor 120 or 121 can extract rough data from strict schema data 190 following data model 105. For example, the extractor may extract data as an extensible markup language (XML) file or a relational database management system (RDBMS) file.

In some embodiments, filter 130 or 131 can complete the attribute filtering of different entities in the rough data, and then output loose schema data 140 or 141, such as populating the data into a graph.

In some embodiments, enrichment 150 can perform some enrichment operations on the basis of loose schema data 140 or 141 to obtain the desired enriched data 160. For example, the enrichment operation may detect implicit edges/closed loop on a graph (see FIG. 4 for an example graph).

In some instances, in previous schema systems the filters had a high coupling dependence on the data modes. Thus, the enrichments were also be affected by the data model because enrichments enrich the loose schema data from the filter.

Within a conventional strict schema structure transformation process, configurations of the strict schema database have a low development efficiency. For example, any update to the data model may cause code changes due to the high coupling with a data model. Likewise, conventional configurations of strict schema database had poor code cohesion. For example, even if the transform logic of different entities were the same, they may need to be processed independently due to different attributes of the different entities. Similarly, conventional configurations of strict schema operations for databases had limited enrichment functions. For example, rigid data processing logic inevitably affects the expansion of enrich operation since the data processing logic may not be modified without revamping the entire system. All of the issues of conventional attempts culminate in an increased maintenance effort to maintain a strict schema database as the life of the database expands. Homogeneous code logic in different pipelines and complicated branches in single pipeline mean the systems lacked a technical ability to allow flexibility in processing data and organizing the results in a meaningful manner.

This disclosure proposes an enhanced method to process data with a schema/model, filter requirement and enrichment requirements and input/translate received data into rule definitions and actions. With rule definitions and actions, the rule engine and action engine will generate a standard workflow to finish the process of extracting, filtering, and enrichment, such that it will reduce (if not eliminate) the problems that arise with the high coupling dependency between filters and data models as discussed above within conventional solutions.

Figure 2:
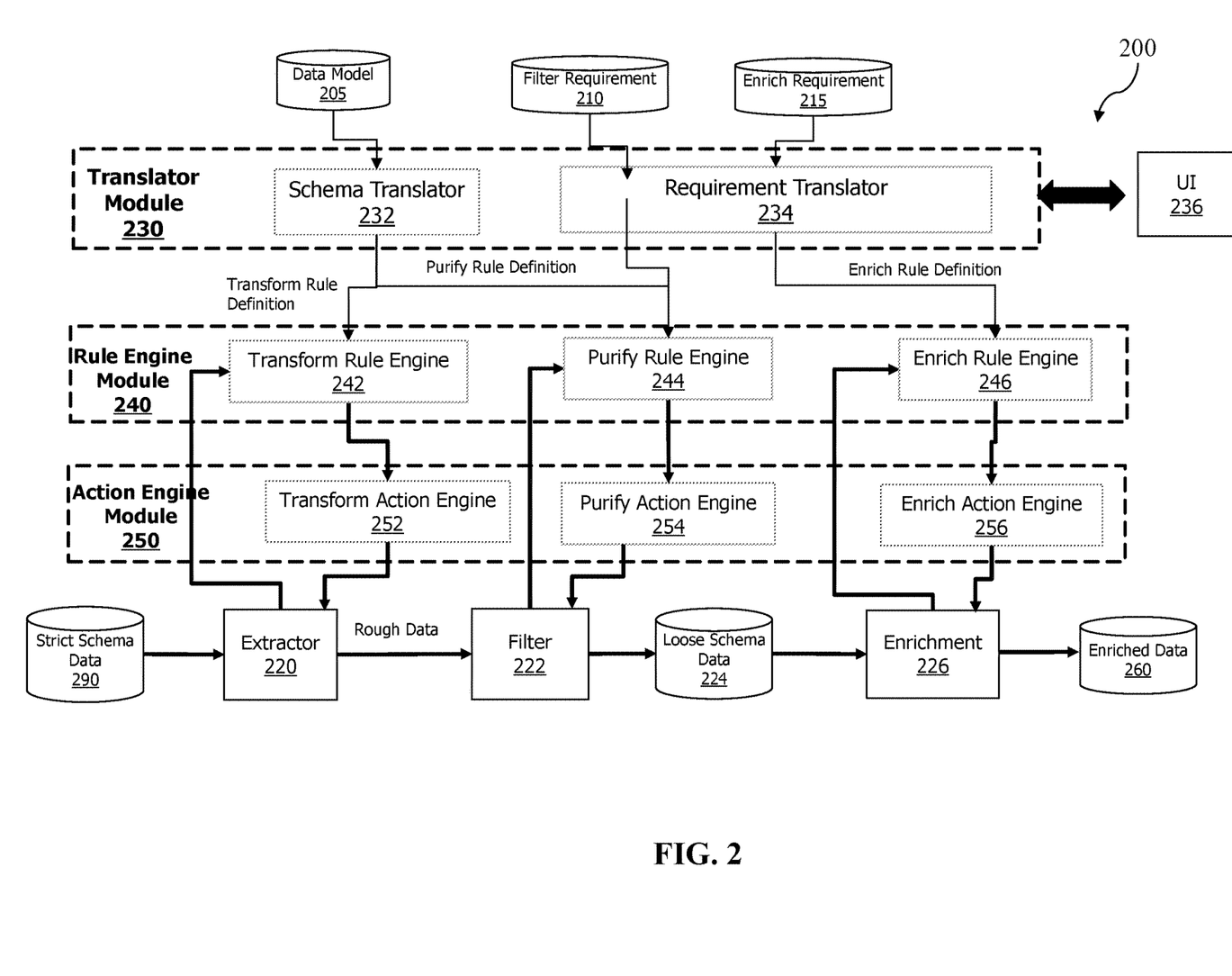
FIG. 2 depicts an architecture for an example strict schema system according to various embodiments of the present invention.

In some embodiments, FIG. 2 depicts an architecture for an example strict schema system 200. In some embodiments, a translator module 230 receives input and constructs sematic rules. In some embodiments, rule conditions may be provided to an experienced user so the user may construct the rules. In some embodiments, conditions include mapping progressions or metrics for the data. For example, a user may input sample conditions for mapping data by selecting data processing conditions (nodes herein) (see FIG. 4 for examples of nodes).

In some embodiments, a user interface may follow syntax of semantic rule request user input for a rule editor. In some instances, syntax refers to the computer language a rule is written in. In some instances, a rule editor is a user interface for controlling, modifying, or inputting syntax for rules of the strict schema system. For example, the nodes depicted in FIG. 4 below may represent one or more lines of syntax for a strict schema system. In some embodiments, nodes refer to user interface icons that may allow a user to draft the syntax or type of schema for a particular pipeline.

Figure 4:
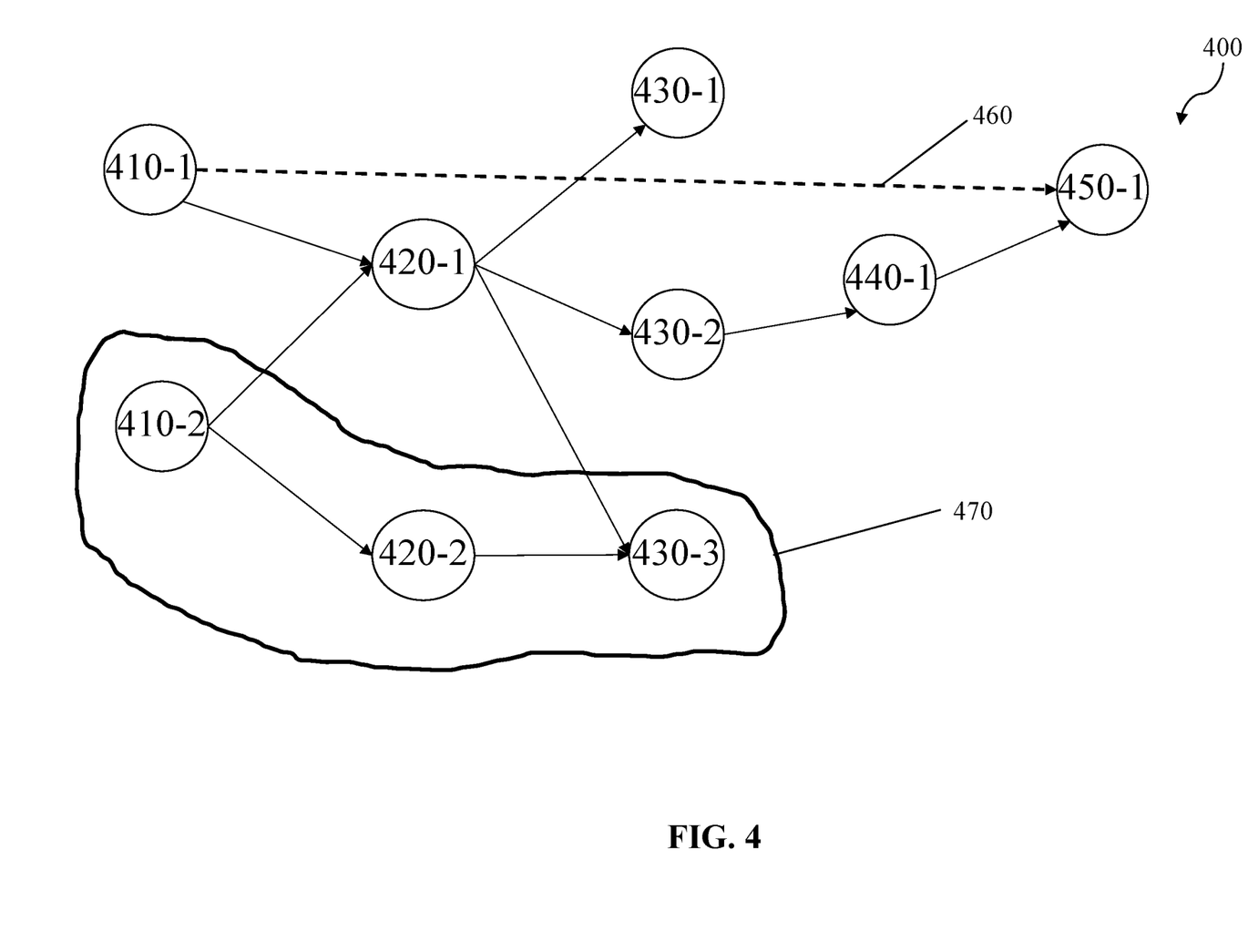
FIG. 4 depicts an example graph for a strict schema system, according to various embodiments of the present disclosure.

A user could use draw a polygon in the user interface to select multiple nodes (see FIG. 4 for examples of nodes) to describe what the expected subgraph looks like (see FIG. 4 for example sub-graph 470). In some embodiments, a selected subgraph may be translated into conditions. In some embodiments, a graph is a display of the nodes, and a subgraph is a collection of the nodes selected by the user.

In some embodiments, a translator module 230 may receive a data model 205 and use a schema translator 232 to define a transformation rule. In some embodiments, the mapping may be from a previously generated set of rules to a new set of rules. In some instances, the translator may map an original data module to rules from a legacy application to rules for a new application. For example, a legacy application that categorized data by characters (e.g., alphabetical order) may be translated into a rule in a new system to categorize by characters. A transformation rule definition may broadly be described as a directory that states the nature type of data that is stored in a given part of the data model. More specifically, the transformation rule definition is a logical statement that correlates a specific set of fields within a data model as relating to specific predetermined data points, where these data points are defined by the schema of the data model. Therefore, a transform action derived from the transformation rule definition allows a computing system to reliably pull an expected portion of data from the correct specific set of fields within the data model.

In some embodiments, translator module 230 may receive a filter requirement 210, an enrichment requirement 215, and use a requirement translator 234 to identify an enrich rule definition. This enrich rule definition may be communicated to (and used to generate graphical data on) user interface (UI) 236. In some embodiments, the filter requirement describes what categories of data should be removed before processing. In some embodiments, the enrichment requirement describes a bypassing or shortcut for the subgraphs. For example, in a query system, a search on prime ministers may eliminate non-relevant subgraphs (where a subgraph is a collection of nodes in a graph). In this example, the non-subgraph may be system may be about determining the subjects animal genus or species. Since a prime minister is always going to be human, the system already knows the genus/species the subject belongs to. In some embodiments, the enrichment 226 creates a direct path from one node to another, bypassing nodes that may intervene (see FIG. 4 for examples of nodes and bypassing). Following the same example, if prime ministers have to be over the age of 30, the system may skip a node determining if the prime minister is over the age of 30.

In some embodiments, the translator module 230 may use the schema translator 232 in conjunction with the requirement translator 234 to derive a purify rule definition from data model 205, filter requirement 210, and enrich requirement 215. In some embodiments, the purify rule definition determines what nodes may be filtered out. For example, if a query comes in with "what Guiness means," and the question is looking for a person and not a beverage, the purify rule engine 244 may work with the purify action engine 254 to create a rule (e.g., not a beverage) and pair it with an action (e.g., filter out nodes concerning a beverage). In some embodiments, the translation is performed by providing syntax for one or more semantic rules to a user via a rule editor. For example, a semantic rule editor may look similar to the graph in FIG. 4, where each node represents a collection of syntax and the user may form rules by selecting one or more nodes.

In some embodiments, rule engine module 240 and action engine module 250 may match different rule definitions to trigger actions with transformation rule engine 242 and transform action engine 252. For example, matching a transformation rule definition and transform action for extractor 220. In some embodiments, the extractor 220 may use matched transformation rule definitions and transform actions to transform the strict schema data 290 into rough data for filter 222. In some instances, a transformation rule may be transforming data from a legacy system to a new system. In some instances, transformations rules outline how data should be transformed for a new platform and the transformation action engine determines what actions need to be performed based on the rules to enact the transformations. For example, the transformation may be simply porting data into new columns with respective headings that match an input for a new system or providing a data conversion. An example of data conversion may be simply converting a percentage to a fraction.

In some embodiments, rule engine module 240 and action engine module 250 may match a purify rule definition and purify action for filter 222 with purify rule engine 244 and purify action engine 254. In some embodiments, filter 222 may then filter the rough data received from extractor 220 with the matched purify rule and purify action to form loose schema data 224. Some examples of the purify rules may be a question and true false or a criterion leading the next set of nodes (see FIG. 4 for examples of nodes).

In some embodiments, rule engine module 240 and action engine module 250 may match an enrich rule definition and enrich action for enrichment 226 using enrich rule engine 246 and enrich action engine 256. In some embodiments, enrichment 226 may enrich the loose schema data 224 using the enrich rule definition to apply the matched enrich action to loose schema data 224 thereby forming enriched data 260.

Figure 3:
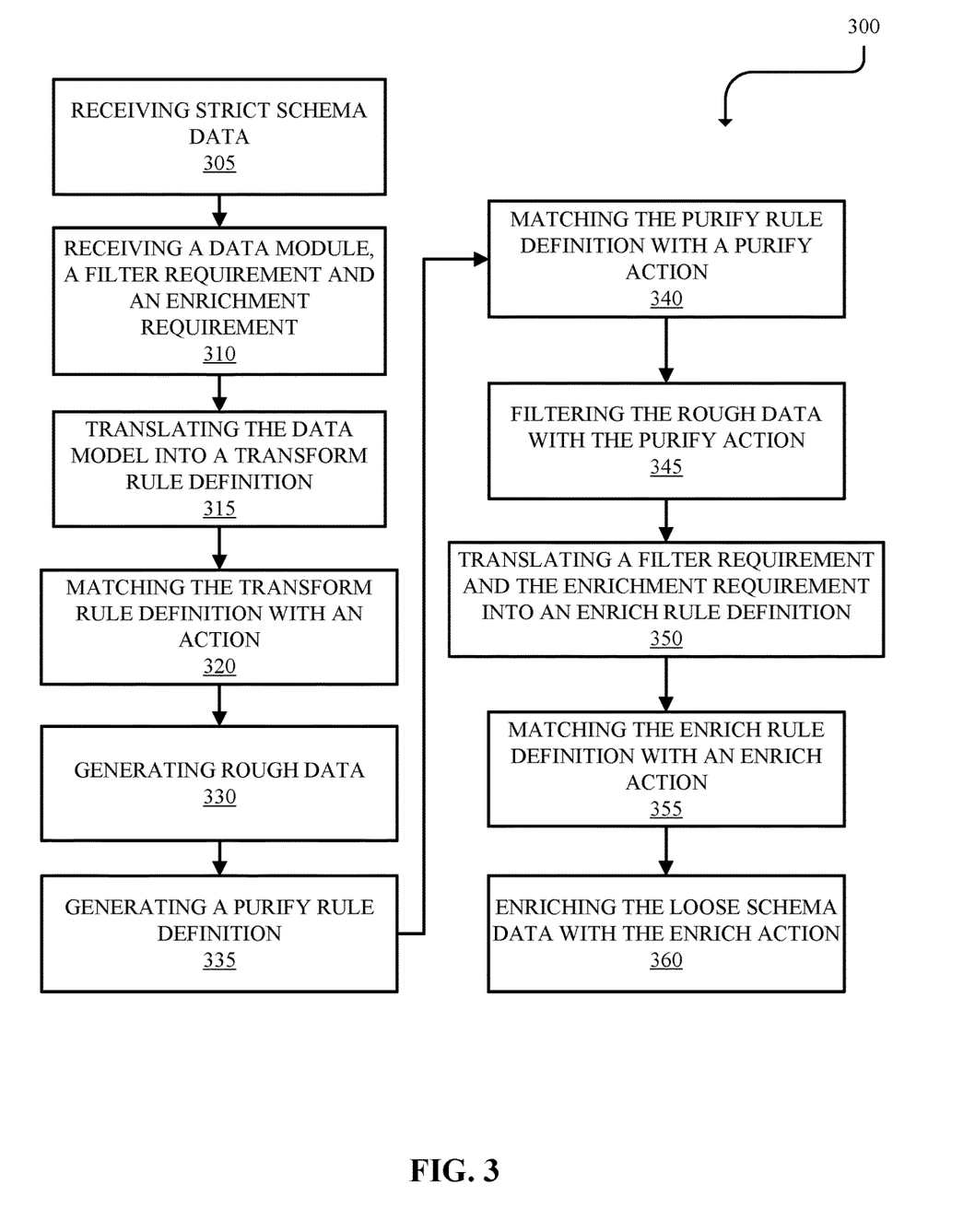
FIG. 3 illustrates an example method for transforming data processing of a strict schema structure, according to various embodiments of the present invention.

FIG. 3 depicts an example method 300 for transforming data processing of a strict schema structure. Operations of method 300 may be enacted by one or more computer systems such as the system described in FIG. 5 below. In some embodiments, method 300 is a list of operations that may be used to form the architecture described in FIG. 2 above.

Method 300 begins with operation 305 of receiving strict schema data. In some embodiments, strict schema data includes archived data that may need to be transferred from a legacy application to a new application, a new stream of data, a data repository converted to a new format that needs to be processed to work with an existing application, etc.

Method 300 continues with operation 310 of porting a data module, a filter requirement and an enrichment requirement into a strict schema system. For example, a system may extract one or data filtering requirements by the filter requirement and configure that requirement to work with the strict schema system. In some instances, that the porting may be providing and/or configuring the requirement to work in the strict schema system.

Method 300 continues with operation 315 of translating the data model into a transformation rule definition with a translator module. Translation of data model components into rules for a database schema requires checking the requirements, gathered by the system or an analysts and presented in the form of rules. In some instances, the translations take requirements from the data models (e.g., entity-relationship models) and implement the requirements as syntax. In some instances the syntax may be presented in natural languages or SQL (Structured Query Language) queries for the user. In some instances, the translation of the data model is performed by providing a user with sample rule conditions and receiving user selections.

Method 300 continues with operation 320 of fitting the transformation rule definition with an action and providing it to an extractor. In some instances, the fitting (e.g., matching) may include the satisfaction of certain criteria of the system the strict schema is being used for. The action may be a previously associated action (e.g., an action from the data model), or the action may be a new action as determined by the system according to the strict schema.

Method 300 continues with operation 330 of generating rough data by performing the transformation action on the strict schema data based on the transformation rule.

Method 300 continues with operation 335 of using a translator module to generate a purify rule definition from the data model and the filter requirement.

Method 300 continues with operation 340 of fitting the purify rule definition with a purify action and providing it to a filter. In some instances, the fitting may include the satisfaction of certain criteria of the system the strict schema is being used for. The action may be a previously associated action (e.g., an action from the data model or the filter requirement), or the action may be a new action as determined by the system according to the strict schema.

Method 300 continues with operation 345 of filtering the rough data with the purify action, based on the purify rule definition, to form loose schema data.

Method 300 continues with operation 350 of translating a filter requirement and the enrichment requirement into an enrich rule definition. In some instances, the translation of a filter requirement is performed by providing a user with sample rule conditions and receiving user selections. In some instances, all or some of the described translations may be performed by providing a user with sample rule conditions and receiving user selections.

Method 300 continues with operation 355 of fitting the enrich rule definition with an enrich action. In some instances, fitting a rule definition with an action includes determining the syntax required to cause the data to comport with the rule. For example, the system could write syntax to cause the data to skip "what type of animal" nodes whenever it is determined that a subject is a human or an inanimate object.

Method 300 continues with operation 360 of enriching the loose schema data with the enrich action, based on the enrich rule definition, to generate enriched data. In some instances, the enriching includes processing the loose schema data with the syntax for the enrich action determined in operation 355.

FIG. 4 illustrates an example graph 400 for a strict schema system, according to various embodiments of the present disclosure. In some instances, example graph 400 is comprised of one or more nodes 410-1, 410-2, 420-1, 420-2, 430-1, 430-2, 430-3, 440-1, and 450-1. Each node may be a decision node is a strict schema system. For example, each node may include a node to categorize data based on categories, where categories may create heading "Known for xxxx" or "type of xxxx" (e.g., where xxxx may be subjects such as actor, beverage, author, company, director of a specific company or company type, etc.).

In some embodiments, example graph 400 may be displayed on a user interface where a user may select specific nodes to run data through. The user selection may bypass nodes (a technical ability not currently present in strict schema systems) allowing the system to run more efficiently. In some instances, a user may draw polygon 470 in a user interface creating a sub-graph of nodes 410-2, 420-2, 430-3 for filtering data.

In some embodiments, line 460 displays the effect of enrichment. By passing data passing through node 410-1 may automatically bypass nodes 420-n, 430-n, and 440-n since the enrichment rule allowed the system to determine that all data passing through node 410-1 would go to 450-1. For example, for a query about a subject's occupation where all queries making it to 410-1 are human and 430-2 is the only node of 430-N that supports humans, the query would necessarily be passed on to 450-1. Thus, the processing power normally used for the other nodes may be saved, presenting a technical ability not achievable with current schema systems.

Figure 5:
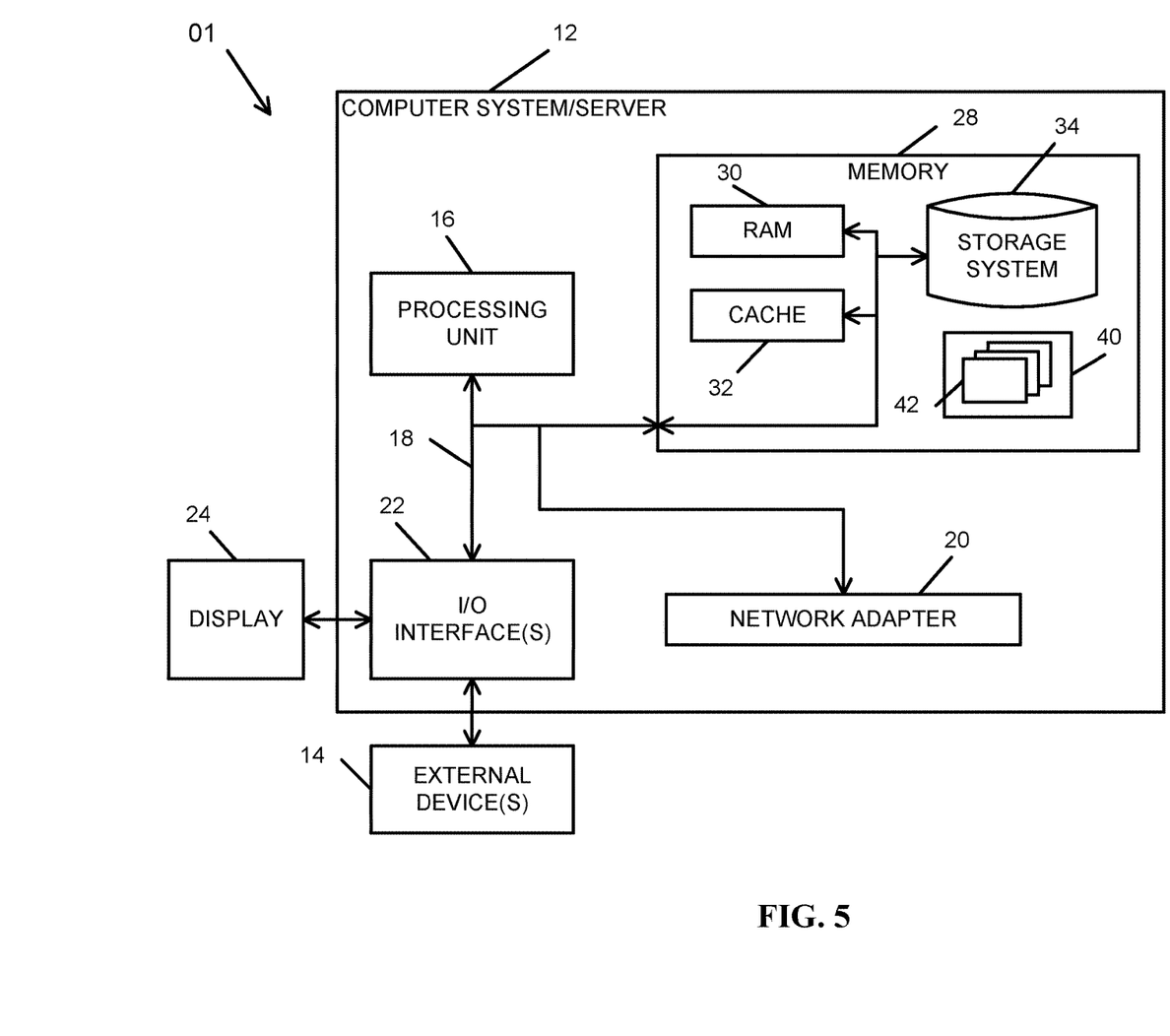
FIG. 5 depicts a computer system according to various embodiments of the present invention.

In an exemplary embodiment, the system (e.g., strict schema system 200) includes computer system 01 as shown in FIG. 5 and computer system 01 may perform one or more of the functions/processes described above. Computer system 01 is only one example of a computer system and is not intended to suggest any limitation as to the scope of use or functionality of embodiments of the present invention. Regardless, computer system 01 is capable of being implemented to perform and/or performing any of the functionality/operations of the present invention.

Computer system 01 includes a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 12 may be described in the general context of computer system-executable instructions, such as program modules, being executed by a computer system. Generally, program modules may include routines, programs, objects, components, logic, and/or data structures that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computer system 01 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As is further depicted and described below, memory 28 may include at least one program product having a set (e.g., at least one) of program modules that are configured to carry out the functions/operations of embodiments of the invention.

Program/utility 40, having a set (at least one) of program modules 42, may be stored in memory 28 by way of example, and not limitation. Exemplary program modules 42 may include an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the present invention.

Computer system/server 12 may also communicate with one or more external devices 14 such as a keyboard, a pointing device, a display 24, one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
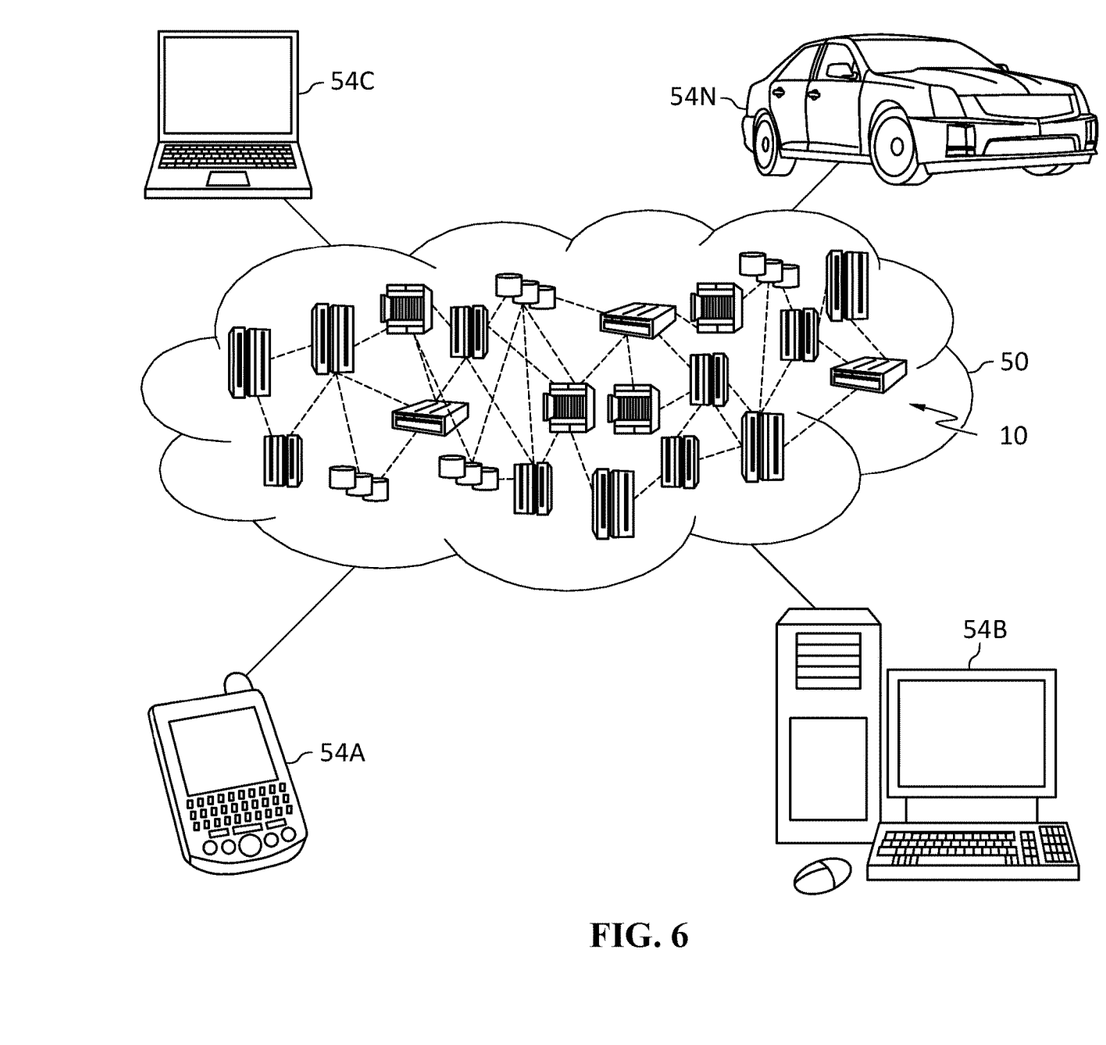
FIG. 6 depicts a cloud computing environment according to various embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
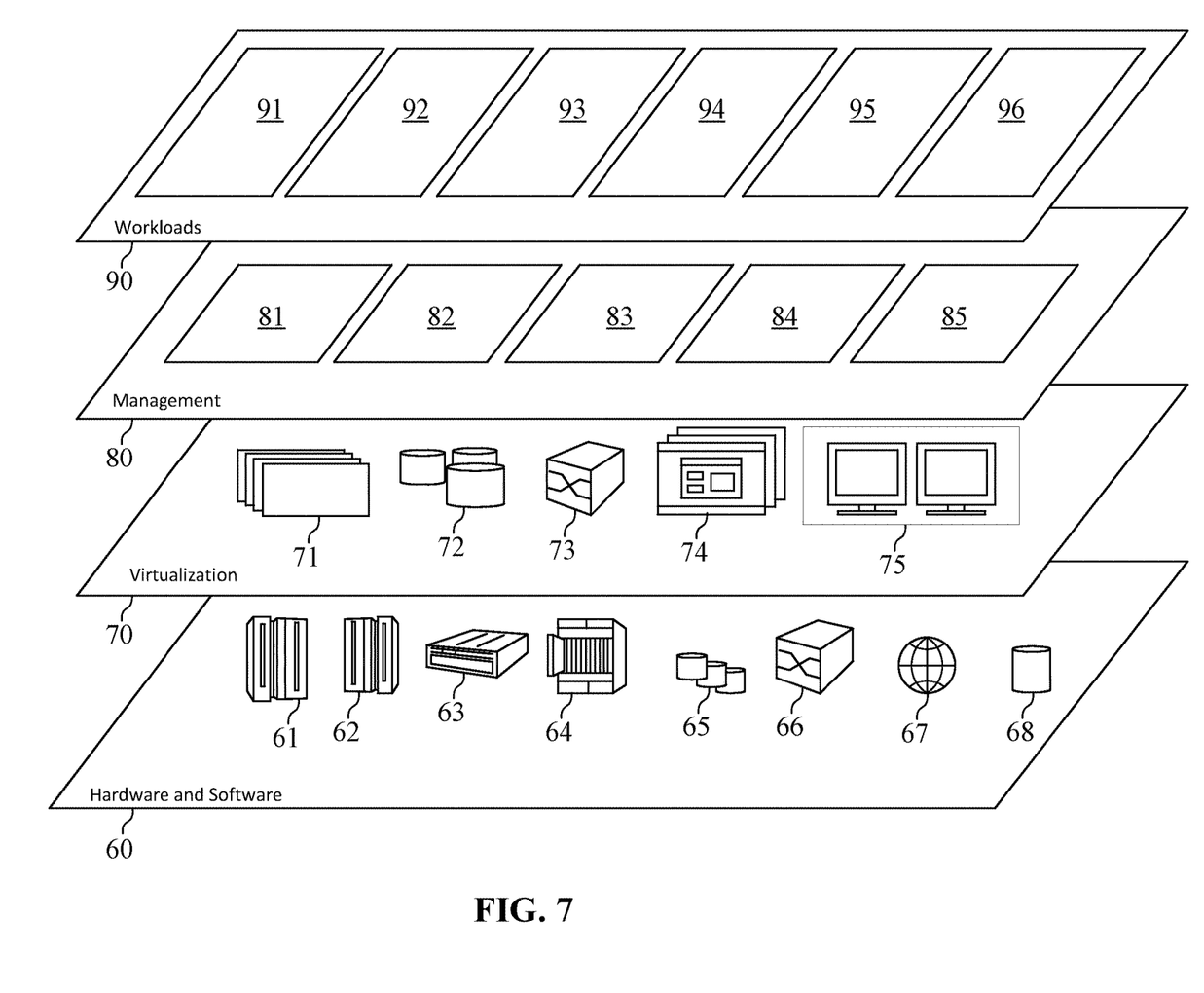
FIG. 7 depicts abstraction model layers according to various embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive neural networks 96.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system comprising:
   a memory; and
   a processor in communication with the memory, the processor being configured to perform processes comprising:
   porting a data model into a strict schema system;
   translating the data model into a transformation rule definition;
   fitting the transformation rule definition to a transform action;
   receiving strict schema data;
   modifying the data model using a semantic rule to transform the strict schema data;
   performing the transform action on the strict schema data based on the transformation rule definition to form rough data;
   mapping, by a translator, an original data model to rules from a legacy application,
      wherein the transformation rule is a logical statement that correlates a specific set of fields within the data model as relating to specific predetermined data points,
      wherein the data points are defined by the strict schema system of the data model;
   porting a filter requirement,
   translating the data model and the filter requirement into a purify rule definition;
   fitting the purify rule definition to a purify action;
   filtering the rough data with the purify action based on the purify rule definition to form the loose schema data;
   receiving an enrich requirement;
   translating the filter requirement and the enrich requirement into an enrich rule definition;
   fitting the enrich rule definition to an enrich action; and enriching the loose schema data with the enrich action based on the enrich rule definition to generate enriched data; and
   executing, based on the mapping, filtering and enriching operations on the rough data to form loose schema data.

2. The system of claim 1, wherein the system is used to generate multiple-functional pipelines.

3. The system of claim 1, wherein one or more of the translations are performed by providing a user with sample rule conditions and receiving user selections.

4. The system of claim 1, wherein one or more of the translations are performed by providing syntax for one or more semantic rules to a user via a rule editor.

5. The system of claim 1, wherein one or more of the translations are performed by:
   receiving a polygon selection of multiple nodes to determine a subgraph; and
   translating the subgraph into conditions.

6. A method comprising:
   porting a data model into a strict schema system;
   translating the data model into a transformation rule definition;
   fitting the transformation rule definition to a transform action;
   receiving strict schema data;
   configuring the data model using a semantic rule to transform the strict schema data;
   performing the transform action on the strict schema data based on the transformation rule definition to form rough data;
   mapping, by a translator, an original data model to rules from a legacy application,
      wherein the transformation rule is a logical statement that correlates a specific set of fields within the data model as relating to specific predetermined data points,
      wherein the data points are defined by the strict schema system of the data model,
   porting a filter requirement;
   translating the data model and the filter requirement into a purify rule definition;
   fitting the purify rule definition to a purify action;
   filtering the rough data with the purify action based on the purify rule definition to form the loose schema data;
   receiving an enrich requirement;
   translating the filter requirement and the enrich requirement into an enrich rule definition;
   fitting the enrich rule definition to an enrich action;
   enriching the loose schema data with the enrich action, based on the enrich rule definition, to generate enriched data; and
   executing, based on the mapping, filtering and enriching operations on the rough data to form loose schema data.

7. The method of claim 6, wherein the system is used to generate multiple-functional pipelines.

8. The method of claim 6, wherein one or more of the translations are performed by providing a user with sample rule conditions and receiving user selections.

9. The method of claim 6, wherein one or more of the translations are performed by providing syntax for one or more semantic rules to a user via a rule editor.

10. The method of claim 6, wherein one or more of the translations are performed by:
   receiving a polygon selection of multiple nodes to determine a subgraph; and
   translating the subgraph into conditions.

11. A computer program product comprising a computer readable storage medium having program instructions embodied therewith, the program instructions executable by a processor to cause the processors to perform a method, the method comprising:
   porting a data model into a strict schema system;
   translating the data model into a transformation rule definition;
   fitting the transformation rule definition to a transform action;
   receiving strict schema data;
   configuring the data model using a semantic rule to transform the strict schema data;
   performing the transform action on the strict schema data based on the transformation rule definition to form rough data;
   mapping, by a translator, an original data model to rules from a legacy application,
      wherein the transformation rule is a logical statement that correlates a specific set of fields within the data model as relating to specific predetermined data points,
      wherein the data points are defined by the strict schema system of the data model;
   porting a filter requirement;
   translating the data model and the filter requirement into a purify rule definition;
   fitting the purify rule definition to a purify action;
   filtering the rough data with the purify action based on the purify rule definition to form the loose schema data;
   receiving an enrich requirement;
   translating the filter requirement and the enrich requirement into an enrich role definition, fitting the enrich rule definition to an enrich action;
      enriching the loose schema data with the enrich action based on the enrich rule definition, to generate enriched data; and
   executing, based on the mapping, filtering and enriching operations on the rough data to form loose schema data.

12. The computer program product of claim 11, wherein the system is used to generate multiple-functional pipelines.

13. The computer program product of claim 11, wherein one or more of the translations are performed by providing a user with sample rule conditions and receiving user selections.

14. The computer program product of claim 11, wherein one or more of the translations are performed by providing syntax for one or more semantic rules to a user via a rule editor.

* * * * *